No. 733,907. Patented July 14, 1903.

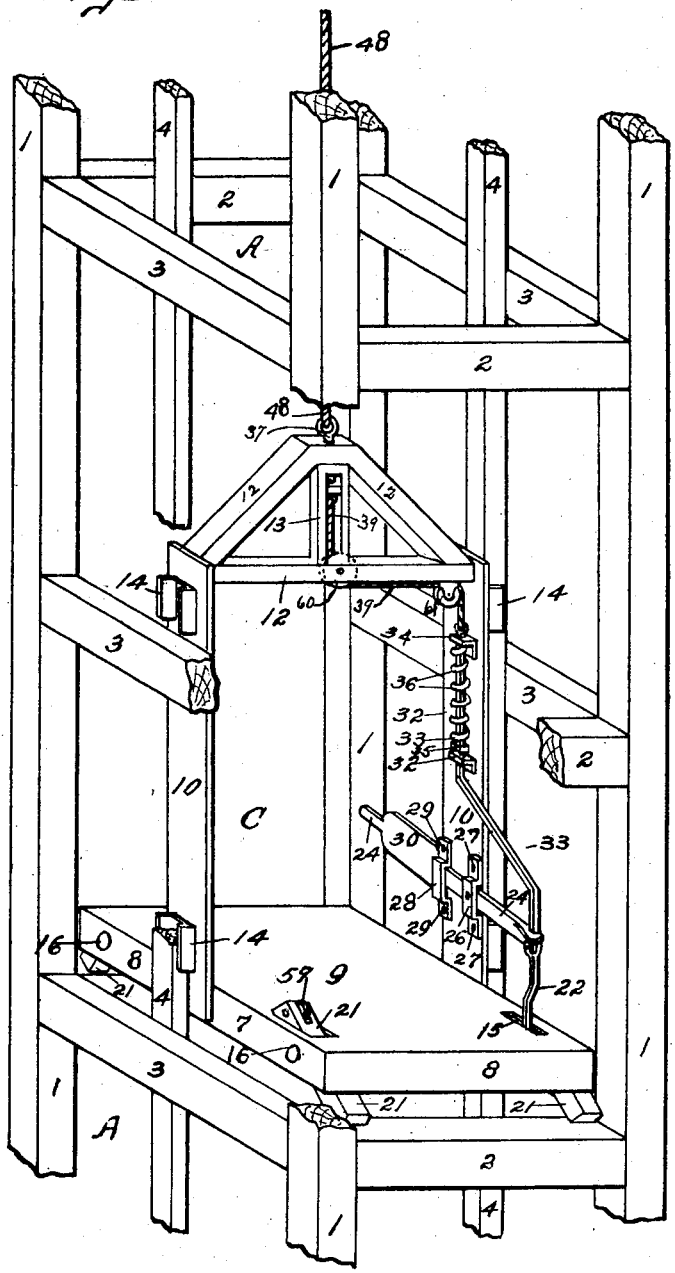

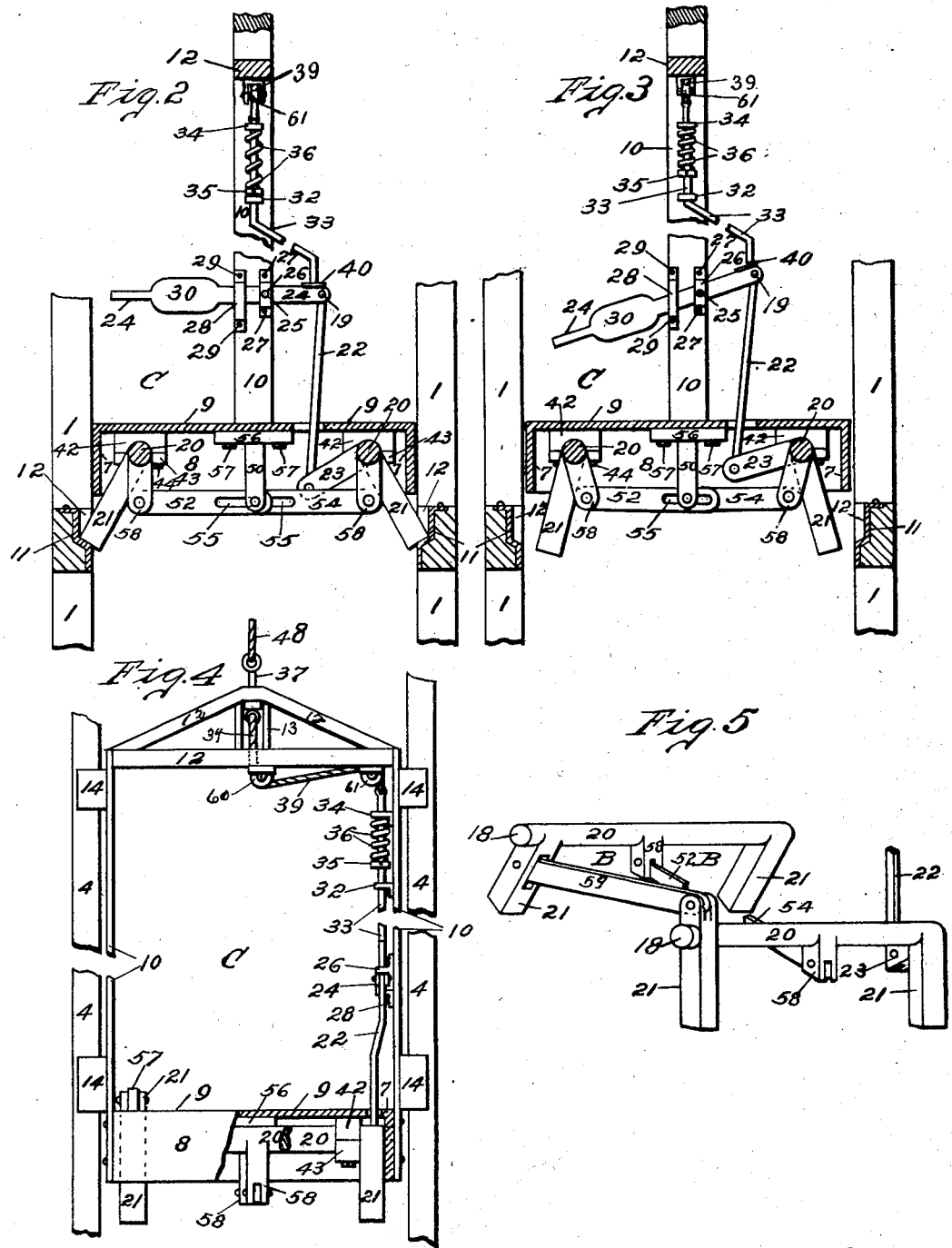

UNITED STATES PATENT OFFICE.

HARRY HANSON, OF LOS ANGELES, CALIFORNIA, AND FREDERICK L. DWIGHT, OF BISBEE, ARIZONA TERRITORY.

SAFETY-CHAIR FOR MINING-CAGES.

SPECIFICATION forming part of Letters Patent No. 733,907, dated July 14, 1903.

Application filed October 21, 1902. Serial No. 128,160½. (No model.)

*To all whom it may concern:*

Be it known that we, HARRY HANSON, a resident of Los Angeles, county of Los Angeles, and State of California, and FREDERICK L. DWIGHT, a resident of Bisbee, county of Cochise, and Territory of Arizona, citizens of the United States, have invented and discovered a new and useful Improvement in Safety-Chairs for Mining-Cages; and we do hereby declare the following to be a full, clear, and exact description of the invention, such as will enable others skilled in the art to which it appertains to make and use the same.

This invention relates to improvements in safety-chairs for mining-cages and the like; and the objects of our improvement are, first, to provide means whereby mining-cages and cages for elevators may be stopped with certainty at predetermined stations within the frame of shafts of mines and of buildings; second, to afford facilities secured to the cage for readily controlling the movement of the cage within the frame of the shaft; third, to construct movable legs connected to the cage and stationary supports upon the frame of the shaft by means of which the cage securely rests at predetermined points within the frame of the shaft, and, fourth, to devise an automatic locking device whereby should the cable or the safety-chain of the cage break at any point of elevation thereof the cage automatically rests and is securely held upon portions of the frame of the shaft. We attain these objects by the construction illustrated in the accompanying drawings, in which—

Figure 1 is a perspective view of portions of the frame of the shaft before it is inserted into the mine with parts thereof broken away, a view in perspective of the cage within the frame of the shaft, the cable and safety-chain attached to the cage, the automatic locking devices holding the legs of the cage upon the front and rear timbers of the frame of the shaft, and the cable and safety-chain slackened. Fig. 2 is a longitudinal sectional view through the cage near one edge thereof, showing the platform of the cage in section, portions of the frame broken away, illustrating the cage resting upon supports made into two of the front and rear timbers of the frame of the shaft at predetermined stations of elevation of the frame, the safety-chain cut and slackened below the point of separation. Fig. 3 is a view similar to that shown in Fig. 2 except that the removable chair-legs of the cage are shown removed from the front and rear timbers of the frame of the shaft, the locking devices in reverse positions from the locking devices illustrated in Fig. 2, the safety-chain severed but drawn tightly below the point of separation. Fig. 4 is a view partly in elevation of portions of the frame, the cage and the locking devices with portions of the frame, cage, and of the locking devices broken away and the platform of the cage partly in section and part thereof in elevation, the cable and safety-chain tightly drawn, and the legs of the cage removed from the supports of the frame; and Fig. 5 is a perspective view of the chair of the cage with the central post removed, toggle-levers, and pitman-rod partly broken away.

Similar reference letters and numerals refer to like parts throughout the several views.

The letter A refers to a section of the frame of the shaft, and numerals 1 1 refer to the four vertical posts thereof to be inserted within the mine. The numerals 2 2 indicate the front and horizontal timbers, which are secured at the ends to the said vertical posts 1 1 of the frame of the shaft. 3 3 indicate the lateral timbers of said frame, which are dovetailed or otherwise connected with the ends of the front and rear timbers 2 2. The ends of the timbers 2 and 3 are secured in recesses in the vertical posts. These posts are preferably made in sections about five feet in length, or longer, if desirable.

Cut into the inner top edges of the front and rear timbers 2 2, as shown in Figs. 2 and 3, at regular distances apart, preferably about one hundred feet apart, near each end thereof, are recesses 11 11, in which are fastened by means of screws, in order to protect the timbers 2 2 from wear, pieces of metal 12 12, upon which the ends of the legs 21 21 of the chair B of the cage abut while the cage C is at rest at the said stations of the frame of the shaft. In case of accident, such as the breaking of the cable 48 or of the safety-chain 39, as shown upon Fig. 2 of the drawings, the legs of the chair of the cage may, however, be made to rest upon the front and rear timbers 2 2 of the frame, as illustrated in Fig. 1.

4 4 refer to the two guide-posts within the frame A of the shaft, secured to the side timbers 3 3 about midway between each of the two pairs of vertical posts 1 1 of the frame A of the shaft, respectively connected to each of said timbers, and these guide-posts 4 4 by means of the guides 14 14, secured to the outer face of the cage-hangers 10 10, serve to keep the cage C within the center of the frame A of the shaft while the cage is being raised and lowered. These said guide-posts 4 4 extend the entire length of the frame A of the shaft, so as to accurately and centrally guide the cage C within the frame A of the shaft from the bottom of the mine to the top thereof—the surface of the earth—and vice versa.

The cage is raised and lowered by winding the cable 48 upon a drum or upon an equivalent device and the drum or said equivalent device revolved by any well-known means.

The reference-letter B refers to the chair of the cage C, which is shown in Fig. 5 of the drawings, and the numeral 9 refers to the platform of the cage C. (Illustrated in perspective in Fig. 1 and in longitudinal sections in Figs. 2 and 3 and partly in cross-section and partly in elevation in Fig. 4 of the drawings.) The platform 9 is preferably made of iron, but may be made of other suitable material, and it consists, preferably, of a rectangular plate, although it may be made of any desired form, having two lateral downward-projecting flanges 7 7 and front and rear flanges 8 8. The said platform, with its flanges, is desirably made of one piece of metal, cast or otherwise, constructed. In each end of the two lateral downward-projecting flanges 7 7, near each end thereof, as shown upon Fig. 1 of the drawings, are two perforations 16 16, in which the ends 18 18 (see Fig. 5) of the oscillating rods 20 20 of the chair B are journaled, and by means of clamping devices, preferably bolts or rivets, the platform 9 is securely held upon the two-part journal-bearings 42 43 and 42 43, secured together by screws 44 44. Near the rear end of the platform 9 of the cage a longitudinal slot 15 is cut therethrough, in which slot the upwardly-projecting pitman-rod 22 reciprocates, which rod 22 connects the hand-lever 24 with the crank-arm 23. (Shown in Figs. 2 and 3.) This crank-arm is connected with and desirably made a part of the rear oscillating rod 20 of the chair. The legs 21 21 of the chair are preferably made a part of the rods 20 20, and one of the front and one of the rear legs are pivotally connected by means of the rod 59, as shown upon Fig. 5 of the drawings. To the oscillating rods 20 20 lugs 58 58 are centrally connected thereto or made integral therewith. These lugs 58 58 are slotted at their free ends, in which slots the toggle-levers 52 54 are pivoted. The inner end of each of said toggle-levers 52 54 is provided with a longitudinal slot 55 55, which slides on a pin in the free end of the central and downwardly-projecting post 50, which has a base 56, which, if desirable, may extend the entire length of the platform 9. The said base 56 of the post 50 is securely held to the platform 9 by means of screws 57 57.

The upper or suspending portion of the cage consists of a double-triangle portion 12 12. The apex of the double triangle is truncated, and through the center of the truncated portion and the vertical brace 13 is provided with a perforation in which the king-bolt 37 reciprocates. In the upper portion of the king-bolt 37 the cable 48 is secured and passes upward to the top of the mine and is reeled upon any well-known device. (Not necessary to be shown upon the drawings.) To the lower end of the king-bolt 48 a perforated nut is secured and below which is an eye made integral with the king-bolt, in which the safety-chain 39 is fastened at its upper end. The lower portion of the safety-chain passes under and over pulleys 60 61, respectively, and is secured to the upper end of the depressing-rod 33 of the locking device.

The pitman-rod 22, hereinbefore referred to, is pivoted at one end to the free end of the crank-arm 23, and at the opposite end thereof is pivotally connected at 19 to the rear end of the hand-lever 24. The said hand-lever is pivoted to the inner face of one of the vertical hangers 10 of the cage by means of the pivot-pin 25, (shown upon Figs. 2 and 3 of the drawings,) which pivot-pin 25 passes through the bracket 26 into the hanger 10 and is attached to the said hanger 10 by means of screws 27 27 or other devices. The free end of the hand-lever 24 is held in close contact with the vertical hanger 10 of the cage by means of a keeper 28, secured at each end thereof to said hanger 10 of the cage C, by means of screws 29 29, and near the free end of the hand-lever 24 and preferably made a part thereof is a counterweight 30. We secure to the upper end of said hanger 10, to which the hand-lever 24 is pivoted, by means of screws or other equivalent devices, the perforated brackets 32 34, and in perforations in said brackets 32 34 the upper portion of the depressing-rod 33 of the locking device reciprocates. When the safety-chain 39 (shown in Fig. 2 of the drawings) and the cable 48 are slackened, as illustrated in Fig. 1 of the drawings, the lower end of the depressing-rod 33, by means of the coil-spring 36, is forced in contact with the rear end of the hand-lever 24, which is held in a horizontal position against the gravity of the counterweight 30, made a part of the lever 24, as illustrated in Figs. 1 and 2 of the drawings. When the cable 48 and the safety-chain 39 are tight, supporting, for example, the cage and its contents in the shaft, the hand-lever 24 is thrown in the position shown in Fig. 3 of the drawings, the depressing-rod 33 elevated in the brackets 32 34, and the coil-spring 36 coiled more closely together, as illustrated in Figs 3 and 4 of the drawings, the rear end of the hand-lever will become elevated and the opposite end thereof lowered by means of the counterweight 30 thereon. In this position of the hand-lever 24 the pitman-rod 22 is carried upward by the hand-lever 24, the end of the crank-arm 23 likewise elevated, and the legs 21 21, through the action of the toggle-levers 52 54 are removed from the supports, as illustrated in Fig. 3 of the drawings.

It will readily appear from the foregoing description, when read in connection with the drawings hereto appended and made a part of the specification and claims, what is the operation of our invention, and further description of the manner of operating our improvement is deemed unnecessary.

It is obvious that many variations and changes in the details of construction and arrangement of our invention would readily suggest themselves to persons skilled in the art and still be within the spirit and scope of our invention.

We do not desire to confine this invention to the specific construction, combination, and arrangement of parts herein shown and described, and the right is reserved to make all changes in and modifications of the same as come within the spirit of this invention; but we do desire to secure as our invention all features of construction and equivalents thereof that come within the scope of our improvement as herein shown and described and illustrated upon the drawings appended hereto.

Having described our invention, what we claim, and desire to secure by Letters Patent, is—

1. A frame for mining-shafts provided with lateral timbers and front and rear timbers, the upper and inner edges of said front and rear timbers having recesses therein, in combination with a cage having a platform and movable chair-legs secured thereto, and means whereby the said legs of the chair are thrown out of contact with said recesses.

2. A frame for mining-shafts having lateral timbers, and front and rear timbers, the upper and inner edges of one or more of said front and rear timbers provided with recesses, pieces of metal inserted in said recesses in said front and rear timbers of the frame, in combination with a cage having suspending devices, a platform and movable chair-legs secured to the under face of said platform and means whereby the legs of the chair are thrown in contact with said recesses.

3. In safety devices for operation within mine-shafts, a cage having a slotted platform, laterally and downwardly projecting flanges provided with perforations near each end thereof, oscillating rods or shafts carrying legs, integrally made therewith, a connecting-rod pivotally secured to the upper end of one of said legs above the upper surface of said platform and the opposite end of said connecting-rod pivotally secured near the lower end of one of the front legs, and means for throwing the said legs in contact with supports upon the frame of the shaft, whereby the cage may be temporarily brought to rest at one or more stations within the frame of the shaft.

4. In safety devices for operation within mine-shafts and within building-elevator shafts, a cage provided with hangers secured thereto and one or more guides fastened upon the outer faces of the hangers, guide-posts secured to the frame, the said cage having a slotted platform provided with downwardly-projecting lateral flanges with perforations therein, oscillating rods having legs secured thereto, a crank-arm upon one of said oscillating rods at about right angles to one of said legs, a pitman-rod pivotally secured at one end to said crank-arm and the opposite end pivotally connected to a counterweighted lever, and automatic locking devices for operating said lever whereby the cage is caused to temporarily rest within the frame of the shaft.

5. In safety devices for operation within mine-shafts, a cage having a platform provided with lateral downwardly-projecting flanges, the oscillating rods carrying movable legs made integral with said rods, journal-bearings for said oscillating rods secured to the platform, and means for simultaneously and automatically operating said legs, whereby the cage is securely held at any predetermined station within the frame of the shaft, or released from said stations of the frame.

6. In safety devices for operating within mine-shafts, a cage having a platform provided with hangers rigidly secured thereto, said platform having downwardly-projecting lateral flanges and downwardly-projecting front and rear flanges, said lateral flanges provided with perforations therein near the front and rear ends thereof, oscillating rods having legs rigidly fixed thereon, and devices for oscillating said rods for throwing the said legs in and out of contact with the frame of the shaft.

7. In safety devices for operation within mine-shafts and shafts for buildings, a cage having suspending devices therefor, devices for guiding the cage centrally within the frame of the shaft, the platform of the cage provided with front and rear flanges and having lateral flanges, the lateral flanges having perforations therein near the front and rear ends thereof, oscillating rods journaled in the platform, one of said oscillating rods provided with a crank-arm, a pitman-rod pivoted in the end of said arm, the upper end of said pitman-rod pivotally connected with a hand-lever counterweighted at one end, and locking devices whereby the cage is securely held from descent at any station of the frame of the shaft.

8. In safety devices for operation within shafts, a cage, a cable for suspending the same, said cage provided with hangers having guides upon the outer faces thereof, the frame of the shaft having guide-posts on which the said guides are adapted to move, said cage provided with a slotted platform, the oscillating rods, the movable chair-legs fixed to said rods, journal-boxes secured to the platform and means for automatically operating the chair-legs.

9. In safety devices for operating within shafts of mines and buildings, a cage provided with hangers having guides upon the outer faces thereof, guide-posts, a cable for suspending the cage, a hand-lever pivoted to one of the hangers, a pitman-rod pivoted to one end of the hand-lever and the opposite end thereof to a crank-arm, a crank-arm, the cage provided with a platform having slots in the rear end thereof, oscillating rods journaled within downward perforated lateral flanges of the platform, said oscillating rods carrying legs securely fastened thereto, one of said legs projecting upward through one of said slots in the platform, a connecting-rod pivotally connected at one end thereof to said upwardly-projecting end of said leg, the opposite end of said connecting-rod pivotally connected near the lower end of one of the front legs, whereby all the legs are simultaneously thrown in contact with the frame and the cage caused to rest temporarily at any predetermined station therein.

10. In safety devices for operating within shafts of mines and buildings, a cage provided with hangers having guides upon the outer faces thereof, guide-posts secured to a frame, said guides adapted to slide upon said guide-posts, a hand-lever pivoted to one of the hangers, a pitman-rod pivoted to one end of the hand-lever and the opposite end thereof to a crank-arm, a crank-arm secured to one of the legs and to one of the oscillating rods, a cable for suspending the cage, a king-bolt, a safety-chain and a spring-operating depressing-rod connected to the cable, the cage having a platform with slots in the end thereof, oscillating rods journaled within flanges depending from the platform, the oscillating rods carrying legs fastened thereon, one of said legs projecting upward through one of said slots in the platform, a connecting-rod connected at one end to the top of one of the legs, the opposite end of said connecting-rod connected near the lower end of one of the legs, whereby all the legs are thrown in contact with the frame.

In testimony whereof we have signed our names to this specification in the presence of subscribing witnesses.

HARRY HANSON.
FREDERICK L. DWIGHT.

Witnesses as to signature of Harry Hanson:
AMELIA GUEST,
INEZ MARLIN.

Witnesses as to signature of Frederick L. Dwight:
C. H. HOLZ,
R. T. GRAHAM.